United States Patent
Numao et al.

(10) Patent No.: US 9,793,553 B2
(45) Date of Patent: Oct. 17, 2017

(54) METHOD AND APPARATUS FOR MANUFACTURING SEPARATOR FOR FUEL CELL

(71) Applicant: Nissan Motor Co., Ltd., Yokohama-shi, Kanagawa (JP)

(72) Inventors: Yasuhiro Numao, Kanagawa (JP); Hiroshi Miyaoka, Kanagawa (JP); Takayuki Hirao, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 26 days.

(21) Appl. No.: 14/888,711

(22) PCT Filed: Apr. 9, 2014

(86) PCT No.: PCT/JP2014/060306
§ 371 (c)(1),
(2) Date: Nov. 3, 2015

(87) PCT Pub. No.: WO2014/188807
PCT Pub. Date: Nov. 27, 2014

(65) Prior Publication Data
US 2016/0079611 A1    Mar. 17, 2016

(30) Foreign Application Priority Data

May 23, 2013    (JP) .................................. 2013-109325

(51) Int. Cl.
*H01M 8/02*    (2016.01)
*H01M 8/0202*    (2016.01)
(Continued)

(52) U.S. Cl.
CPC ....... *H01M 8/0202* (2013.01); *H01M 8/0228* (2013.01); *H01M 8/0254* (2013.01);
(Continued)

(58) Field of Classification Search
CPC .. H01M 8/2465; H01M 2/248; H01M 8/0228; H01M 8/241; H01M 8/0206;
(Continued)

(56) References Cited

U.S. PATENT DOCUMENTS

2012/0328957 A1* 12/2012 Hosoe .................... H01G 11/06
429/241
2014/0227622 A1*  8/2014 Nishiyama ............ H01M 8/242
429/463

FOREIGN PATENT DOCUMENTS

EP    1770807 A1    4/2007
EP    1850414 A3    5/2008
(Continued)

*Primary Examiner* — Mark F Huff
*Assistant Examiner* — Monique Wills
(74) *Attorney, Agent, or Firm* — Global IP Counselors, LLP

(57) ABSTRACT

A method for manufacturing a separator assembly includes a preparation step for preparing a first separator, a second separator, and an elastic member; a first placement step for positioning the elastic member and placing the same on a placement surface; a second placement step for positioning the first separator in relation to the elastic member, and placing the first separator so as to overlap the elastic member; and a joining step for joining the elastic member and first separator which have been positioned and made to overlap. In the second placement step, the first separator is made to overlap the elastic member while first positioning members for positioning the elastic member are made to retract into the placement surface.

11 Claims, 13 Drawing Sheets

(51) Int. Cl.
*H01M 8/241* (2016.01)
*H01M 8/0254* (2016.01)
*H01M 8/0297* (2016.01)
*H01M 8/24* (2016.01)
*H01M 8/2465* (2016.01)
*H01M 8/248* (2016.01)
*H01M 8/0228* (2016.01)
*H01M 8/0206* (2016.01)
*H01M 8/1018* (2016.01)
*H01M 8/1004* (2016.01)

(52) U.S. Cl.
CPC ........... *H01M 8/0297* (2013.01); *H01M 8/24* (2013.01); *H01M 8/241* (2013.01); *H01M 8/248* (2013.01); *H01M 8/2465* (2013.01); *H01M 8/0206* (2013.01); *H01M 8/1004* (2013.01); *H01M 2008/1095* (2013.01); *Y02P 70/56* (2015.11)

(58) Field of Classification Search
CPC ................. H01M 8/24; H01M 2/0297; H01M 2008/1095; H01M 8/0202; Y02P 70/56
See application file for complete search history.

(56) References Cited

FOREIGN PATENT DOCUMENTS

| | | |
|---|---|---|
| JP | S60-48435 U | 4/1985 |
| JP | 2002-56882 A | 2/2002 |
| JP | 2006-318863 A | 11/2006 |
| JP | 2008-59760 A | 3/2008 |
| JP | 2010-118306 A | 5/2010 |
| JP | 2012-59383 A | 3/2012 |

* cited by examiner

100

METHOD AND APPARATUS FOR MANUFACTURING SEPARATOR FOR FUEL CELL

CROSS-REFERENCE TO RELATED APPLICATIONS

This application is a U.S. National stage application of International Application No. PCT/JP2014/060306, filed Apr. 9, 2014, which claims priority to Japanese Patent Application No. 2013-109325 filed in Japan on May 23, 2013.

BACKGROUND

Field of the Invention

The present invention relates to a method and an apparatus for manufacturing a separator assembly to be used in a fuel cell made from a stack of fuel battery cells.

Background Information

A fuel cell is configured by stacking, on both surfaces of a membrane electrode assembly (abbreviated as "MEA" below) in which an anode electrode and a cathode electrode are joined to the two surfaces of an electrolyte membrane, hundreds of fuel battery cells held between corrugated separators. It is common to stack a plurality of fuel battery cells in order to achieve a desired output from the fuel cell, and since the stacking aspect affects power generation characteristics, thoroughgoing investigations have been conducted with regard to the positioning of the structural components during stacking. Techniques for positioning the structural components that constitute a fuel cell have been disclosed in which, e.g., holes are provided in two opposing corner parts from among the four corners of a seal part provided on the outer periphery of a MEA, and the four corner parts of a separator, guide pins being inserted through the holes (see Japanese Laid-Open Patent Application No. 2008-59760).

SUMMARY

An electric current is conducted through adjoining separators of adjacent fuel battery cells by contact between the corrugations of the separators; however, variations in shape may prevent full contact between the corrugations, potentially causing electrical resistance to increase once the electric power produced by the fuel battery cells moves between fuel battery cells. Therefore, there are cases when a member such as a spring is provided between adjacent separators in order to absorb variations in the forms of the separators and minimize increases in electrical resistance.

According to the method of Japanese Laid-Open Patent Application No. 2008-59760, when the components constituting the fuel cell, including the spring member described above, are positioned, through-holes are provided in the four corners of the spring member, as well as in the adjacent separators at positions that link to those of the through-holes in the spring member upon stacking, and positioning is performed using positioning pins.

However, through-holes for circulating fuel, oxidant, and cooling fluid in sections outside of the corrugations are formed further outward on the separators than the corrugations. Accordingly, in order to provide the positioning through-holes to the separators, it is necessary to ensure there is no association between the configuration and the through-holes for fuel, etc., irrespective of any variation. To satisfy this requirement, through-holes of one type will be provided further outward than are through-holes of another type, and the contour of the separators must be enlarged. Additionally, although the spring member functions as long as the surface area thereof makes as much contact as possible with the corrugations upon stacking, a disadvantage is presented in that, when through-holes are provided in the corner parts of the structural components and positioning is performed as in Japanese Laid-Open Patent Application No. 2008-59760, because the contours of the separators and the spring member are different, the configuration of the spring member must be enlarged to yield a contour equal to that of the separators, increasing the cost of components.

Therefore, the present invention was contrived in order to overcome the disadvantage described above, it being the purpose of the present invention to provide a method and a apparatus for manufacturing a separator assembly for a fuel cell with which it is possible to highly accurately align a separator and a spring member even without enlarging the separator for alignment purposes or enlarging the contour of the spring member to the same size as that of the separator.

The present invention, which achieves the purpose described above, is a method for manufacturing a separator assembly for a fuel cell in which a channel through which a fluid flows is formed so as to be provided adjacent to a membrane electrode assembly. In this manufacturing method, a first separator having an irregular cross-sectional shape, a second separator having an irregular cross-sectional shape, and an electroconductive elastic member having a contour smaller than the plan-view contour of the first separator and second separator as viewed from the planar direction, are prepared, the elastic member being arranged between the first separator and the second separator, and elastically deforming to maintain contact between the convex portions of the first separator and the convex portions of the second separator that face each other (preparation step). First positioning members provided on a placement surface are then brought into contact with the elastic member, whereby the elastic member is positioned and placed on the placement surface (first placement step). Second positioning members provided in a region of the placement surface that is further outward than the region in which the first positioning members are provided are then brought into contact with the first separator, whereby the first separator is positioned in relation to the elastic member and placed so as to overlap the elastic member (second placement step). The elastic member and the first separator, which have been positioned and made to overlap, are then joined to each other (joining step). The present invention is characterized in that, in the second placement step, the first separator is made to overlap the elastic member while the first positioning members for positioning the elastic member are made to retract into the placement surface.

Additionally, the present invention, which achieves the purpose described above, is a apparatus for manufacturing a separator assembly for a fuel cell. The manufacturing device described above has: a placement part for placing an elastic member, a first separator, and a second separator; first positioning members provided on a placement surface of the placement part, the first positioning members coming into contact with the elastic member to position the elastic member; second positioning members provided in a region that is further outward than the region in which the first positioning members are provided, the second positioning members coming into contact with the first separator to position the first separator in relation to the elastic member; and a joining part for joining the elastic member and first separator aligned by the first positioning members and second positioning members. The present invention is characterized in that the first positioning members can be made to retract into the placement surface.

BRIEF DESCRIPTION OF THE DRAWINGS

Referring now to the attached drawings which form a part of this original disclosure.

DETAILED DESCRIPTION OF THE EMBODIMENTS

Figure 1:
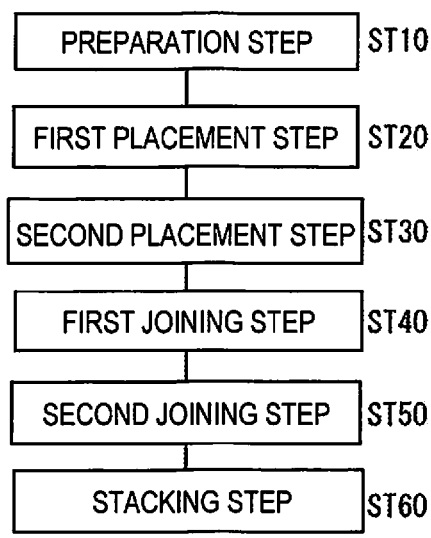
FIG. 1 is a time chart showing the method for manufacturing a separator assembly for a fuel cell according to one embodiment of the present invention.

An embodiment of the present invention is described below with reference to the attached drawings. The description below is not given by way of any limitation of the technical scope or the meaning of terminology described in the claims. Additionally, the proportions in the drawings are exaggerated for convenience of explanation, and may differ from the actual proportions.

Figure 2:
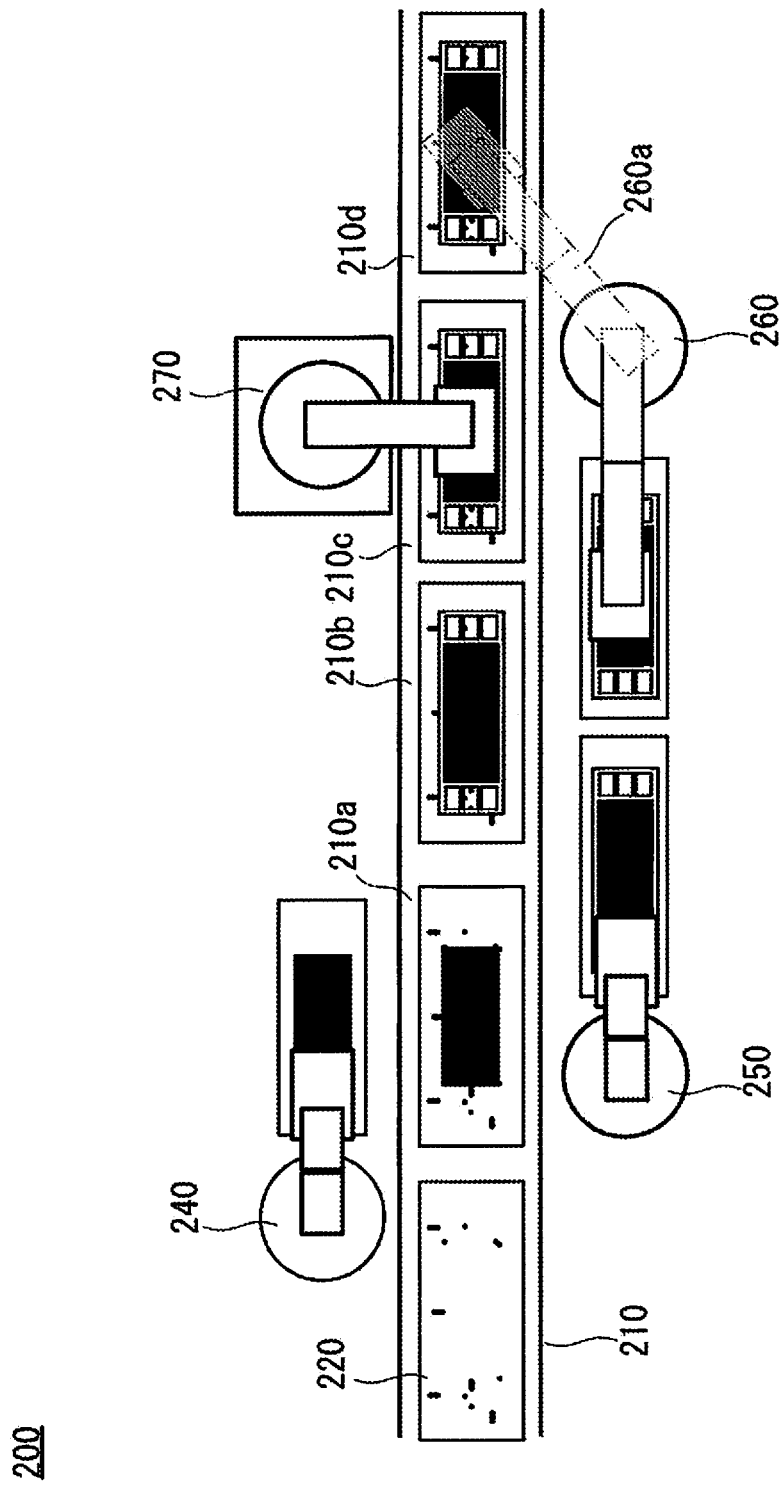
FIG. 2 is a schematic plan view showing a device for forming a separator assembly constituting a fuel cell according to the same embodiment.
Figure 3:
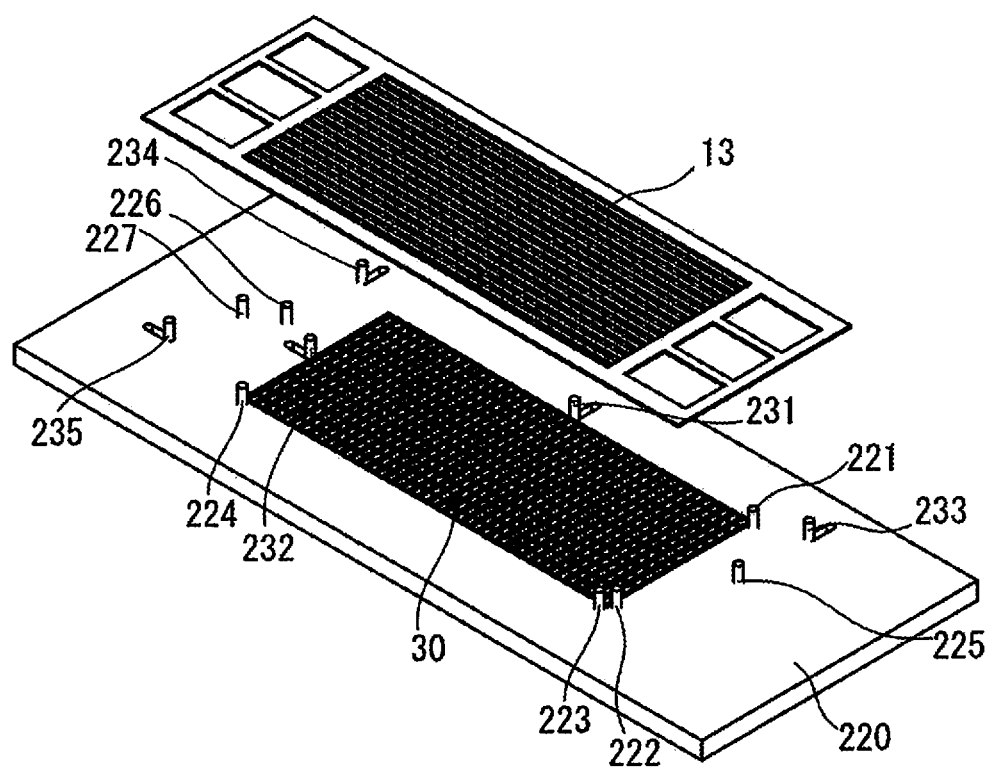
FIG. 3 is a perspective view showing a stage on which a separator and an elastic member are aligned according to the same embodiment.
Figure 4A:
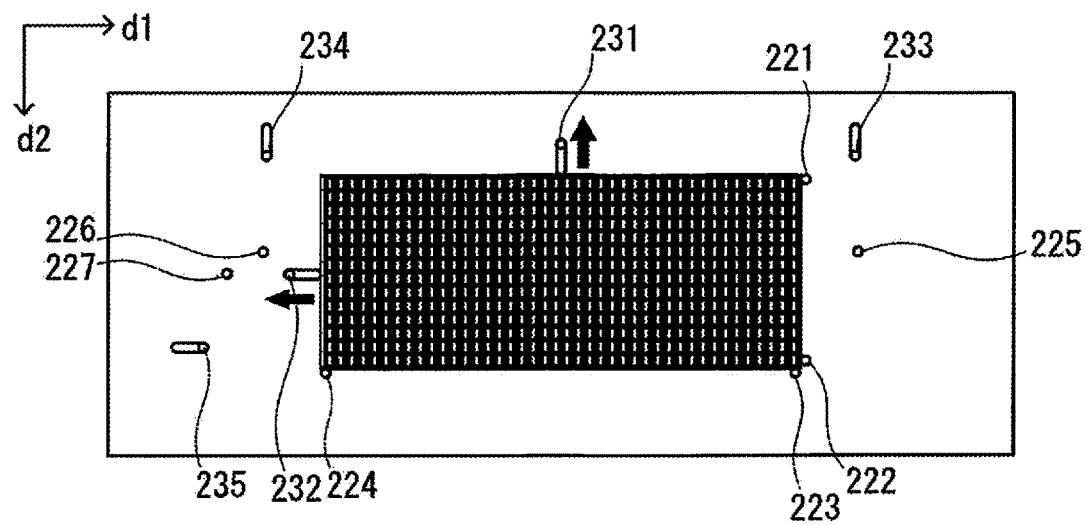
FIG. 4(A) and FIG. 4(B) are a plan views showing a state in which the elastic member is positioned on the stage, and showing a state in which the separator is positioned on the stage.
Figure 4B:
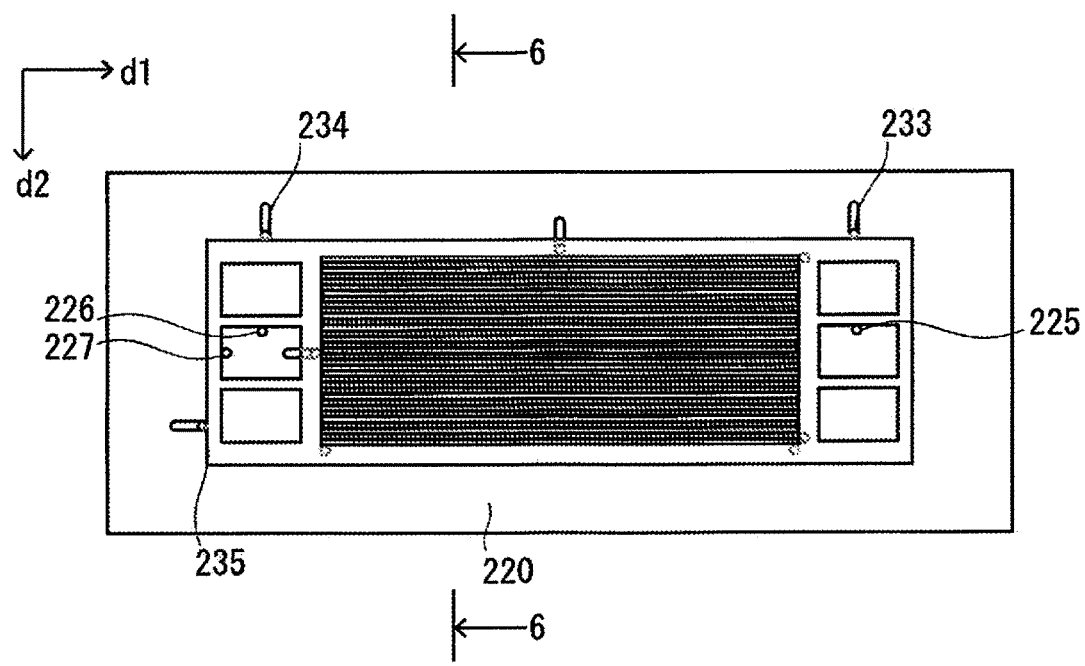
Figure 5:
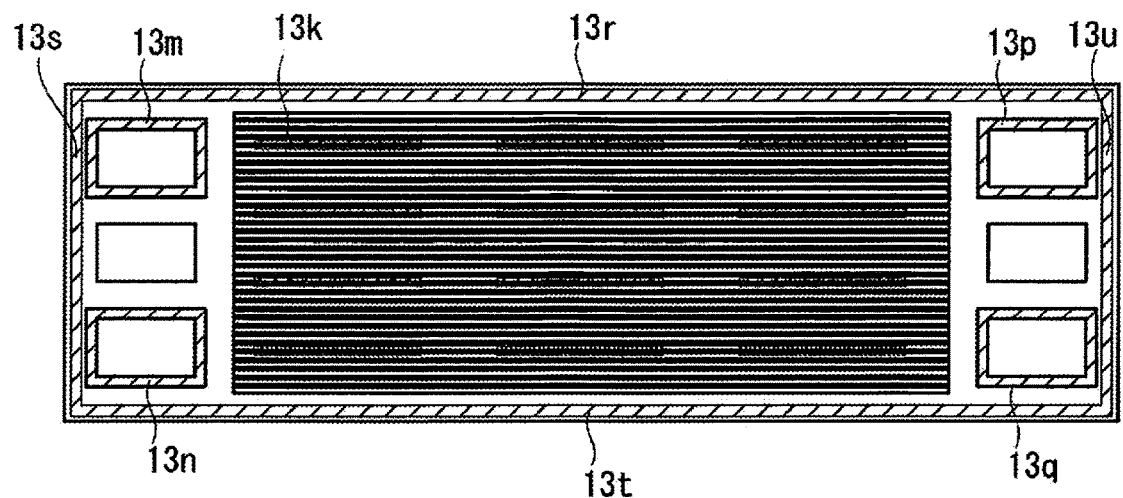
FIG. 5 is a plan view showing the separator that constitutes a fuel cell, in which the plan view shows a joining site between the elastic member and the separator joined to the elastic member, and a joining site between two paired separators.
Figure 6A:
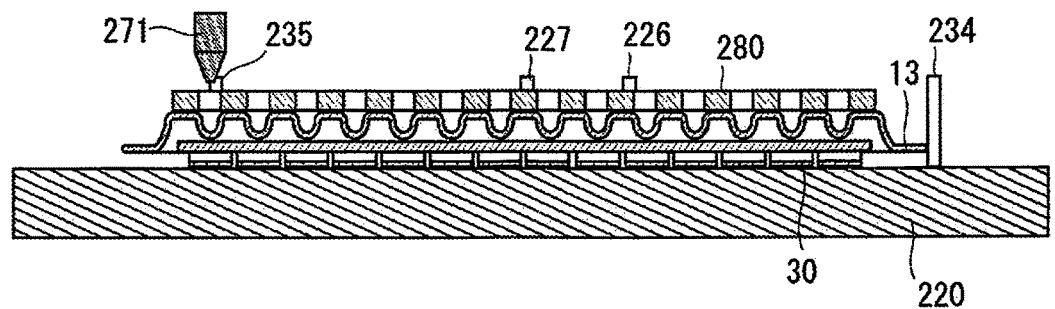
FIG. 6(A) to FIG. 6(C) are cross-sectional views along line 6-6 in FIG. 4(B) that are explanatory drawings showing the manner in which the separator assembly is formed.
Figure 6B:
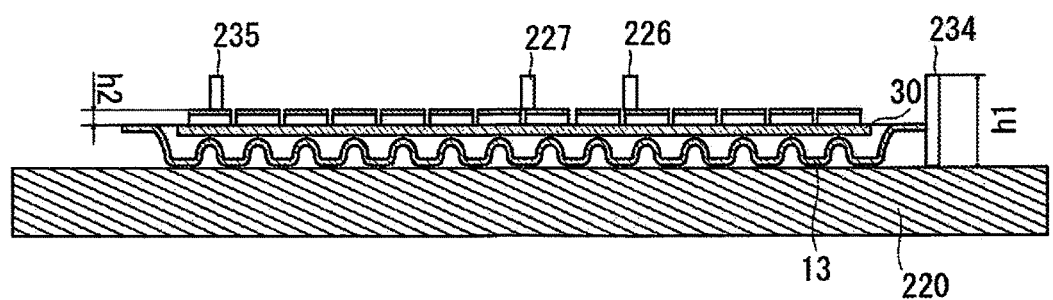
Figure 6C:
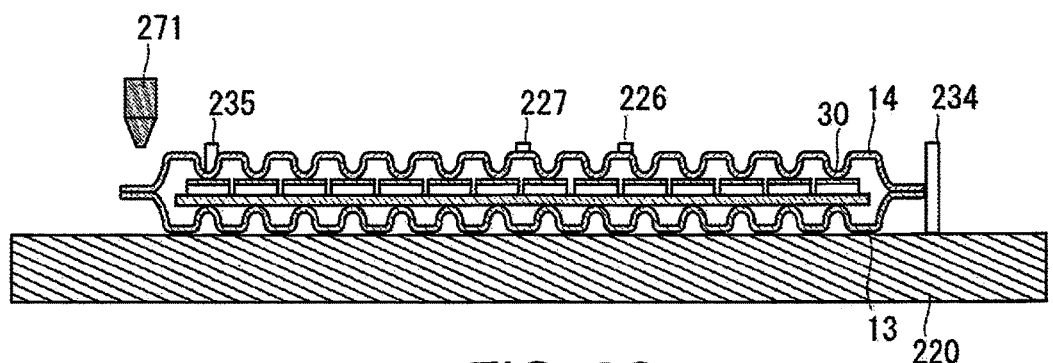
Figure 7:
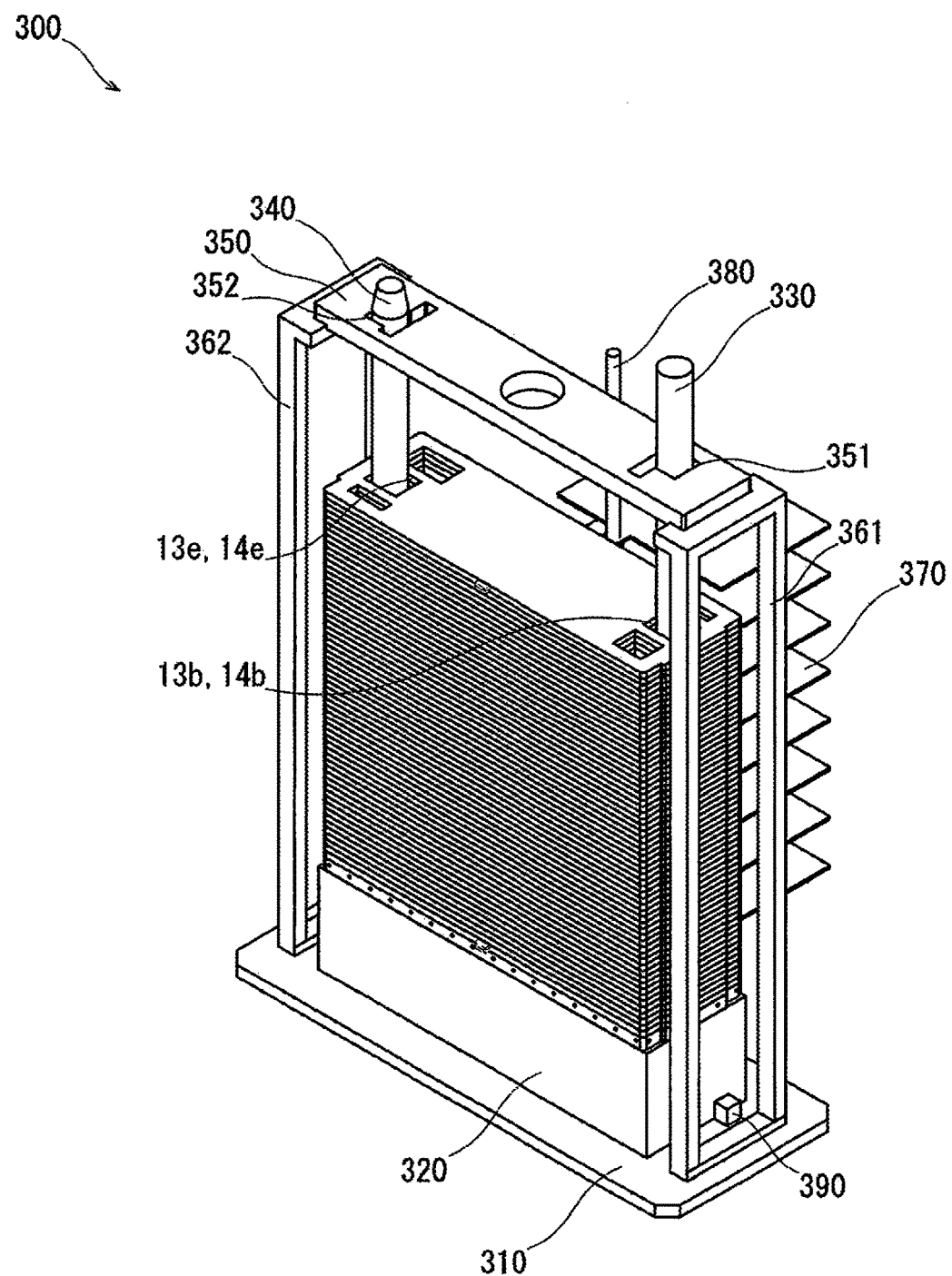
FIG. 7 is a perspective view showing a stacking step for stacking structural components of the fuel cell.

FIG. 1 is a time chart showing the method for manufacturing a separator assembly for a fuel cell according to one embodiment of the present invention, and FIG. 2 is a schematic plan view showing a device for forming a separator assembly constituting a fuel cell according to the same embodiment. FIG. 3 is a perspective view showing a stage on which a separator and an elastic member are aligned according to the same embodiment, FIG. 4(A) is a plan view showing a state in which the elastic member is positioned on the stage, and FIG. 4(B) is a plan view showing a state in which the separator is positioned on the stage. FIG. 5 is a plan view showing the separator that constitutes a fuel cell, in which the plan view shows a joining site between the elastic member and the separator joined to the elastic member, and a joining site between two paired separators. FIG. 6(A) to FIG. 6(C) are cross-sectional views along line 6-6 in FIG. 4 that are explanatory drawings showing the manner in which the separator assembly is formed. FIG. 7 is a perspective view showing a stacking step for stacking structural components of the fuel cell.

Figure 8:
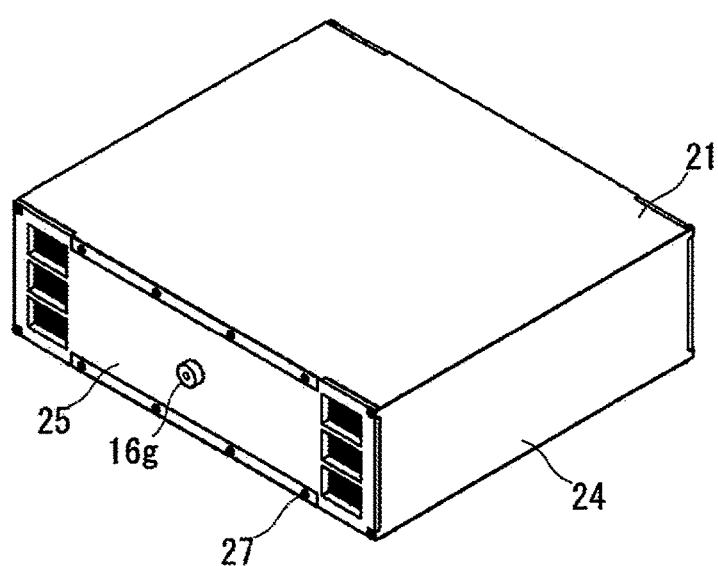
FIG. 8 is a perspective view showing a fuel cell according to the same embodiment.
Figure 9:
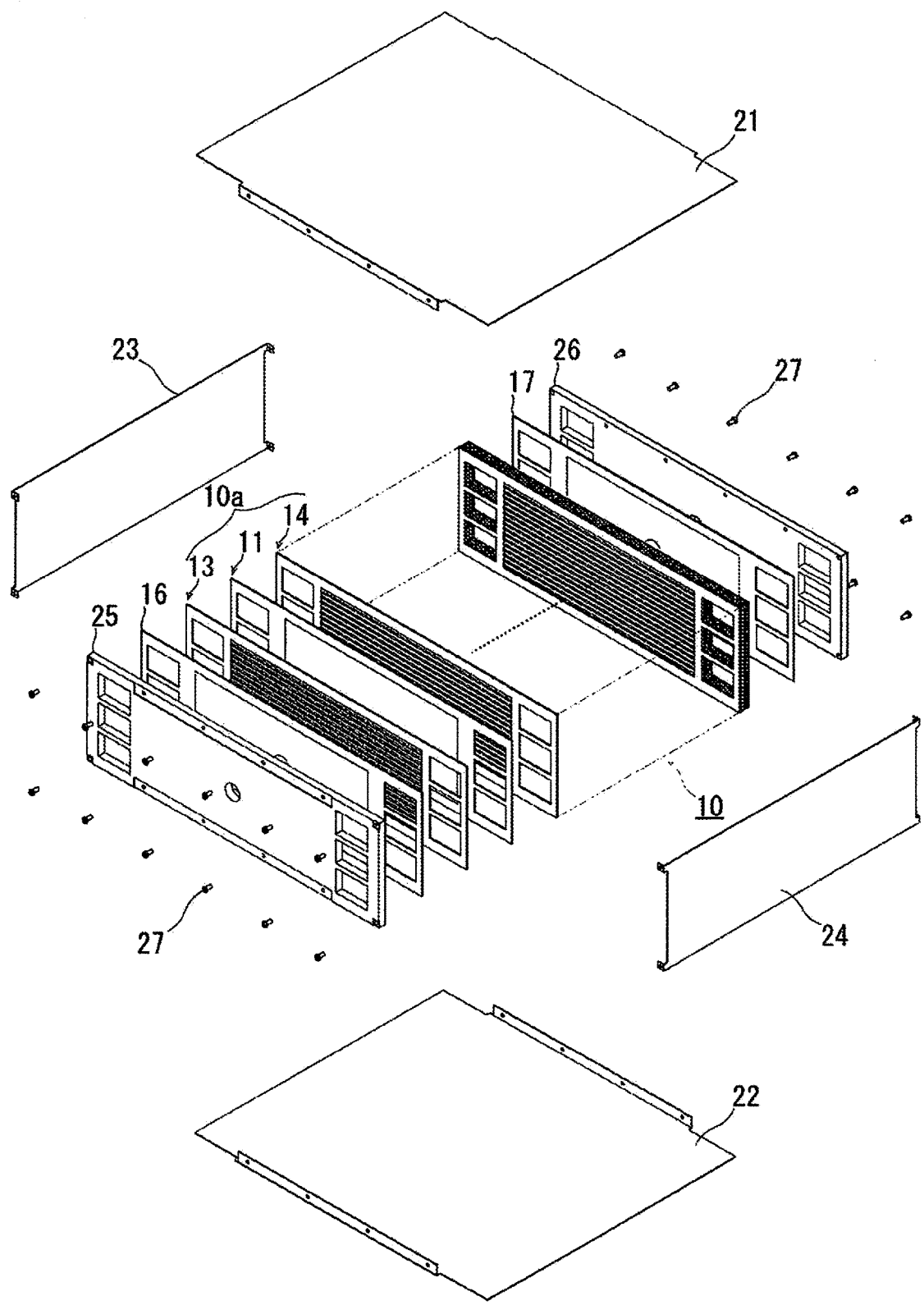
FIG. 9 is an exploded perspective view showing the configuration of the fuel cell.
Figure 10:
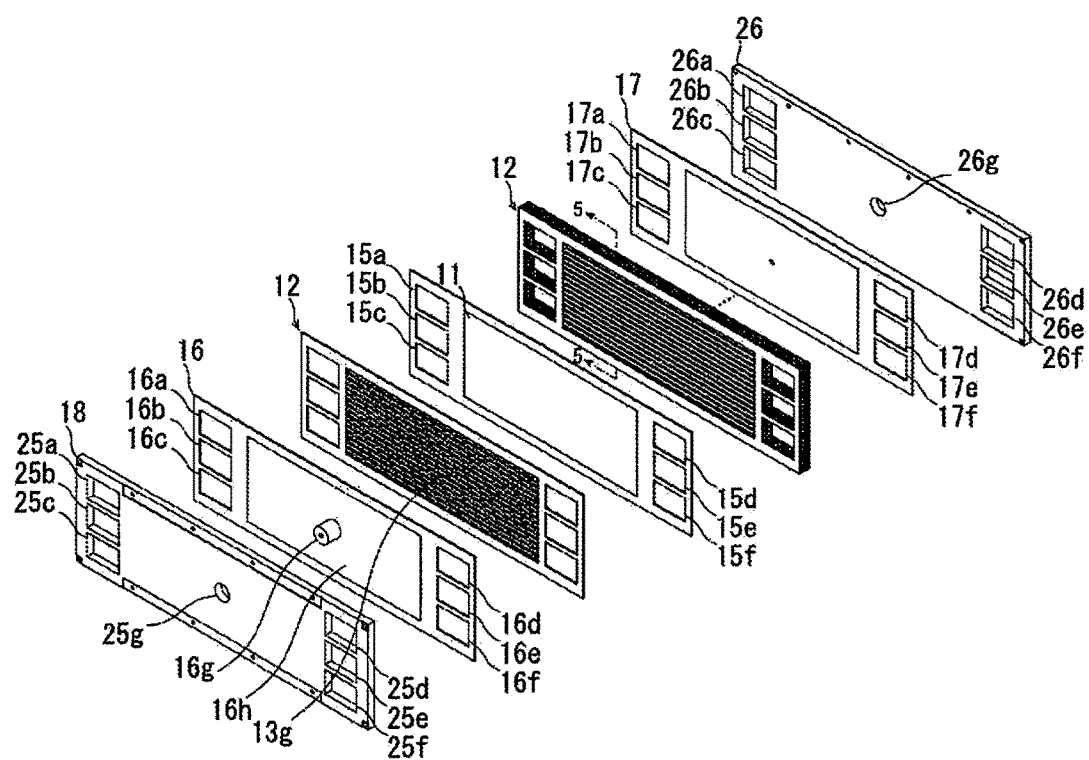
FIG. 10 is an exploded perspective view showing one section of the configuration of the fuel cell.
Figure 11:
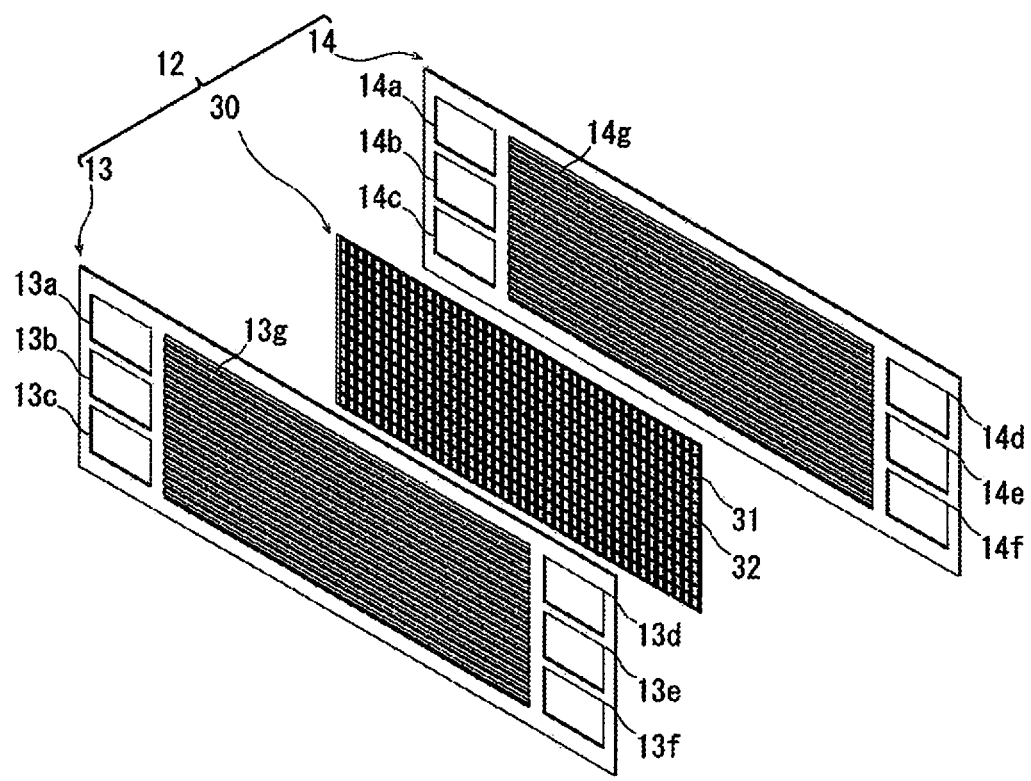
FIG. 11 is a perspective view showing the separator assembly for a fuel cell according to the same embodiment.
Figure 12:
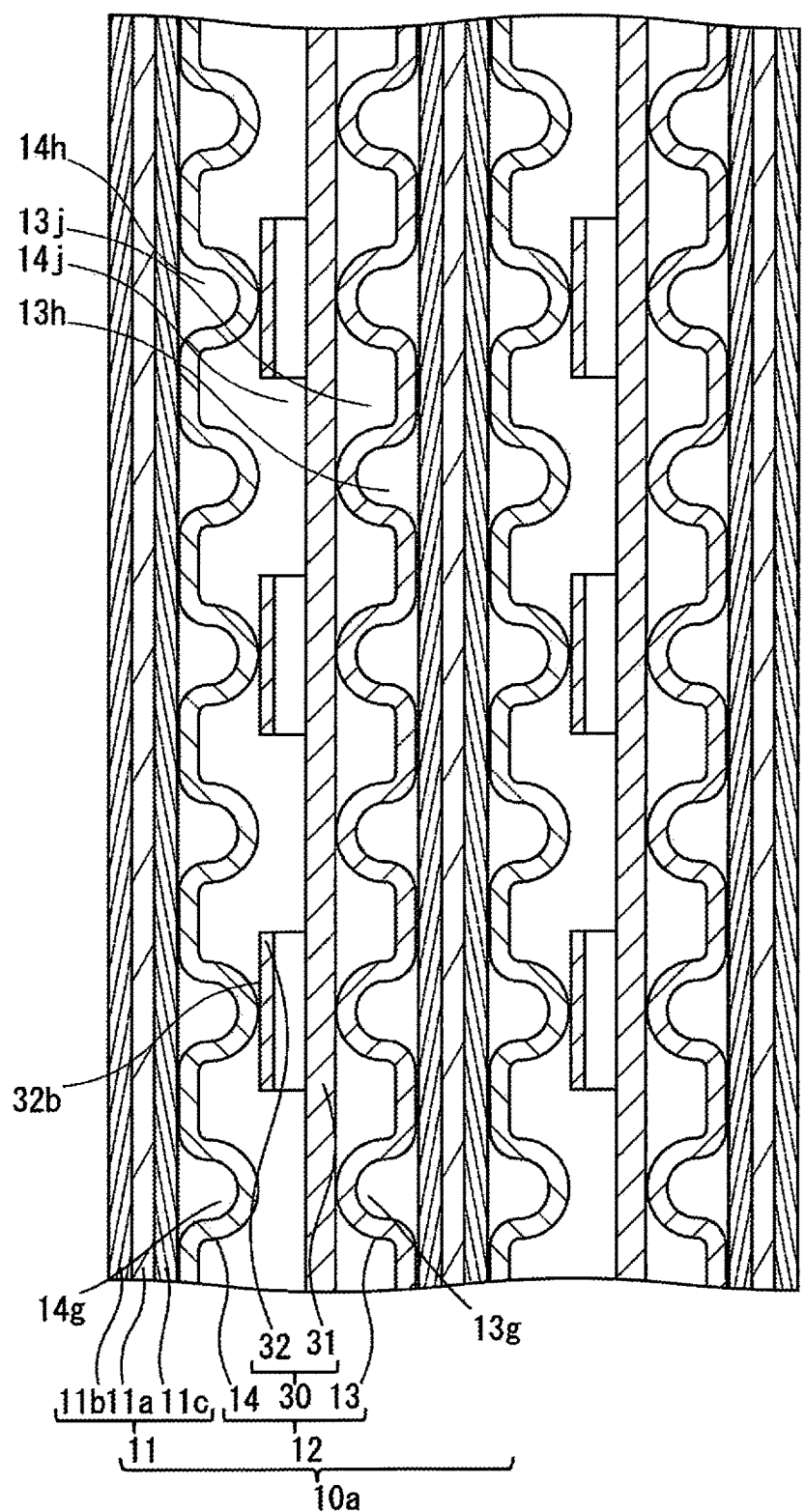
FIG. 12 is a cross-sectional view showing the separator assembly and a membrane electrode assembly according to the same embodiment.
Figure 13:
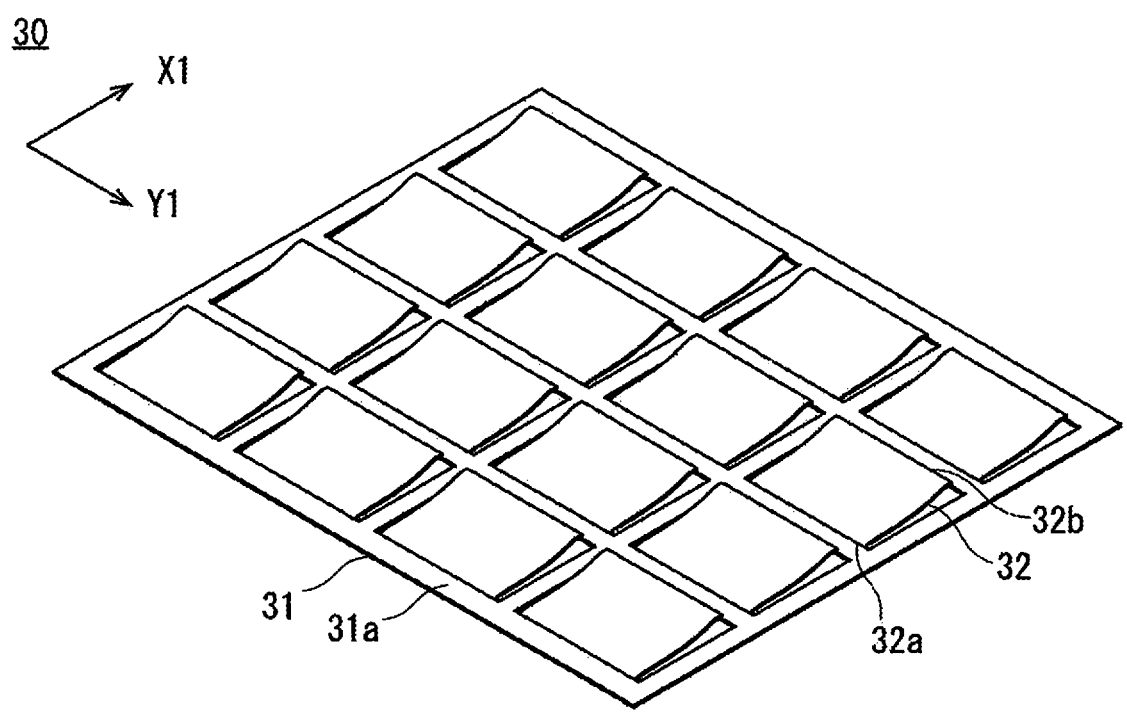
FIG. 13 is a perspective view showing one section of the elastic member constituting the separator assembly according to the same embodiment.

FIG. 8 is a perspective view showing a fuel cell according to the same embodiment, FIG. 9 is an exploded perspective view showing the configuration of the fuel cell, FIG. 10 is an exploded perspective view showing one section of the configuration of the fuel cell, and FIG. 11 is a perspective view showing the separator assembly for a fuel cell according to the same embodiment. FIG. 12 is a cross-sectional view showing the separator assembly and a membrane electrode assembly according to the same embodiment, and FIG. 13 is a perspective view showing one section of the elastic member constituting the separator assembly according to the same embodiment.

A separator assembly 12 for a fuel cell according to the present embodiment is obtained by arranging an elastic member 30 between an anode separator 13 and a cathode separator 14 that are arranged adjacent to a membrane electrode assembly 11, and joining the separator 13 and the separator 14. The method for manufacturing the separator assembly 12 includes a preparation step as shown in FIG. 1 (step ST10), a first placement step (step ST20), a second placement step (step ST30), a first joining step (step ST40, corresponding to a joining step), and a second joining step (step ST50, corresponding to another joining step). Furthermore, performing a stacking step for stacking the membrane electrode assembly 11 and the separator assembly 12 (step ST60) changes this method into a method for manufacturing a fuel cell. Further details are given below.

Fuel Cell

Before the description of the method and apparatus for manufacturing a separator assembly for a fuel cell is given, a description will be given of a fuel cell that comprises a separator assembly for a fuel cell as a structural component. A fuel cell 100 has, as a main structural element, a stack 10 in which a plurality of fuel battery cells 10a are stacked. Each of the fuel battery cells 10a is configured by arranging the separators 13, 14 on both sides of the membrane electrode assembly 11. In the membrane electrode assembly 11, an anode 11b is joined to one side of an electrolyte membrane 11a, and a cathode 11c is joined to the other side. The separator assembly 12 includes the two separators 13, 14 and an elastic member 30 in contact with the corrugations 13g, 14g of the separators 13, 14 between the separator 13 and the separator 14. Current collectors 16, 17 are additionally provided on both end parts of the stack 10 in the stacking direction. The fuel cell 100 also has a casing 20. The casing 20 has pairs of fastening plates 21, 22 and reinforcing plates 23, 24, and end plates 25, 26 (corresponding to end part members). The members included in the fuel battery cells 10a will be described below.

The separators 13, 14, shown in FIGS. 9 to 12, conduct electric power generated by adjoining membrane electrode assemblies 11 in the stacked plurality of fuel battery cells 10a while separating the membrane electrode assemblies 11. The separators 13, 14 are classed as an anode-side separator 13 (corresponding to the first separator) and a cathode-side separator 14 (corresponding to the second separator). The anode-side separator 13 is brought into contact with the anode 11b of the membrane electrode assembly 11. The anode-side separator 13 is made of a metal containing an electroconductive material, and is formed as a thin plate of larger configuration than that of the anode 11b.

A cross-section in the center of the anode-side separator 13, as shown in FIG. 12, is provided with a corrugation 13g comprising a plurality of irregular shapes so as to constitute channels through which a fuel gas (hydrogen) and coolant water or another cooling fluid flow in a separated manner. In the corrugation 13g of the anode-side separator 13, an enclosed space formed by contact with the anode 11b is used as an anode gas channel 13h for supplying hydrogen to the anode 11b. Meanwhile, in the corrugation 13g of the anode-side separator 13, an enclosed space formed with the corrugation 14g of the cathode-side separator 14 interposed by the elastic member 30 is used as a cooling fluid channel 13j for supplying coolant water.

The anode-side separator 13 comprises a longitudinal direction, and through-holes corresponding to a cathode gas supply port 13a, a cooling fluid supply port 13b, and an anode gas supply port 13c are opened in one longitudinal-direction end of the anode-side separator 13. Similarly, through-holes corresponding to an anode gas discharge port 13d, a cooling fluid discharge port 13e, and a cathode gas discharge port 13f are opened in the other longitudinal-direction end of the anode-side separator 13.

The cathode-side separator 14 comes into contact with the cathode 11c of the membrane electrode assembly 11. The cathode-side separator 14 is made of a metal containing an electroconductive material, and is formed as a thin plate of larger configuration than that of the cathode 11c.

A cross-section in the center of the cathode-side separator 14, as shown in FIG. 12, is provided with a corrugation 14g comprising a plurality of irregular shapes so as to constitute a channel part for separating an oxidant gas (pure oxygen or air containing oxygen) and coolant water, the oxidant gas and coolant water passing therethrough. In the corrugation 14g of the cathode-side separator 14, an enclosed space formed by contact with the cathode 11c is used as a cathode gas channel 14h for supplying the oxidant gas to the cathode 11c. Meanwhile, in the corrugation 14g of the cathode-side separator 14, an enclosed space formed with the corrugation 13g of the anode-side separator 13 interposed by the elastic member 30 is used as a cooling fluid channel 14j for supplying coolant water. The elastic member 30, as described later, is formed from a single metal plate or the like in which portions are raised upright as upright pieces 32, and is configured such that both side surfaces of a base material 31 are connected to the portions standing upright from the metal plate. Accordingly, in adjacent fuel battery cells 10a, the cooling fluid channel 13j in the anode-side separator 13 of one fuel battery cell 10a and the cooling fluid channel 14j provided in the cathode-side separator 14 of the other fuel battery cell 10a form a single connected channel for cooling fluid.

The cathode-side separator 14 comprises a longitudinal direction, and through-holes corresponding to a cathode gas supply port 14a, a cooling fluid supply port 14b, and an anode gas supply port 14c are opened in one longitudinal-direction end of the cathode-side separator 14. Similarly, through-holes corresponding to an anode gas discharge port 14d, a cooling fluid discharge port 14e, and a cathode gas discharge port 14f are opened in the other longitudinal-direction end of the cathode-side separator 14. The cathode gas supply ports 13a, 14a, cooling fluid supply ports 13b, 14b, anode gas supply ports 13c, 14c, anode gas discharge ports 13d, 14d, cooling fluid discharge ports 13e, 14e, and cathode gas discharge ports 13f, 14f correspond to separator circulation holes for circulating fuel, oxidant, or cooling fluid.

During alignment with the elastic member 30 described later, the cooling fluid supply ports 13b, 14b and the cooling fluid discharge ports 13e, 14e from among the through-holes are utilized as formations that allow positioning members to be inserted therethrough. Utilizing the cooling fluid supply ports 13b, 14b and the cooling fluid discharge ports 13e, 14e in order to align the elastic member 30 in this manner makes it possible to align the elastic member 30 without providing a formation to be used exclusively for alignment.

The elastic member 30, as shown in FIGS. 11 to 13, deforms in accordance with variations in the corrugations that form the channels for fuel and coolant water in the anode-side separator 13 and the cathode-side separator 14 to absorb these variations during assembly of the fuel cell 100. Furthermore, during operation of the fuel cell 100, the elastic member 30 deforms in accordance with stacking-direction displacement caused by thermal expansion of the separators 13, 14 and stacking-direction displacement caused by expansion due to absorption of the media supplied by the membrane electrode assembly 11 to absorb these displacements. Therefore, it is possible to apply high pressure to the plurality of stacked fuel battery cells 10a to bring the fuel battery cells 10a into close contact with each other. Increases in electrical resistance between fuel battery cells 10a are minimized, and the power generation efficiency thereof improved, correspondingly with respect to closer contact between the plurality of stacked fuel battery cells 10a.

The elastic member 30, as shown in FIG. 13, is made of an electroconductive metal, and is formed in a thin-plate shape. The elastic member 30 is disposed between an anode-side separator 13 and a cathode-side separator 14, and comprises a thin-plate-shaped base material 31 and a plurality of upright pieces 32 provided standing upright in a grid from a base part surface 31a of the base material 31. Specifically, in the elastic member 30, upright pieces 32 that are punched out into a U-shape from a single base material 31 corresponding to a thin plate and then raised upright so as to form a cantilever are formed into a grid. Because the upright pieces 32 have a cantilevered structure relative to the base material 31, the upright pieces 32 are provided with the function of a resilient, elastically deformable spring. In order to display the configuration of the elastic member 30 in a readily understandable manner, FIG. 13 shows a portion of the elastic member 30 shown in FIGS. 11 and 3.

The upright pieces 32, as shown in FIG. 13, are formed in a rectangular shape in which, e.g., the width of a fixed-end part 32a on the base-end side of an upright piece 32 provided to the base part surface 31a of the base material 31 and the width of a free-end part 32b on the distal-end side extending from the fixed-end part 32a along a first direction X1 are equal. The plurality of upright pieces 32 are formed such that the orientations of the free-end parts 32b are in an organized orientation in a plurality of rows along, e.g., another direction Y1 that intersects the first direction X1. In the upright pieces 32, as shown in FIG. 5, the free-end parts 32b on the distal-end side, which extend from the fixed-end parts 32a on the base-end side of the upright pieces 32 provided to the base part surface 31a of the base material 31, are brought into contact with the cathode-side separator 14.

The membrane electrode assembly 11, shown in FIG. 12, causes the supplied oxygen and hydrogen to chemically react in order to produce electric power. The membrane electrode assembly 11 is formed by joining the anode 11b to one side of the electrolyte membrane 11a and joining the cathode 11c to the other side. The membrane electrode assembly 11 is typically referred to as an "MEA." The electrolyte membrane 11a is made of, e.g., a solid polymer material, and is formed in a thin-plate shape. One example of the material used as the solid polymer material is a fluorine-based resin that conducts hydrogen ions and has excellent electrical conduction properties while in a wet state. The anode 11b is configured by stacking an electrode catalyst layer, a water-repellent layer, and a gas diffusion layer, the anode 11b being formed in a thin-plate shape slightly thinner than the electrolyte membrane 11a. The cathode 11c is configured by stacking an electrode catalyst layer, a water-repellent layer, and a gas diffusion layer, the cathode 11c being formed in a thin-plate shape of the same size as the anode 11b. The electrode catalyst layers in the anode 11b and cathode 11c contain an electrode catalyst in which a catalyst component is supported on an electroconductive carrier, and a polymeric electrolyte. The gas diffusion layers in the anode 11b and cathode 11c are formed from, e.g., carbon cloth, carbon paper, or carbon felt woven using fibers comprising carbon fiber filaments having sufficient diffusion properties and electroconductivity.

The MEA 11 comprises a frame member 15. The frame member 15 integrally holds the outer periphery of the stacked electrolyte membrane 11a, anode 11b, and cathode 11c. The frame member 15 comprises, e.g., an electrically insulated resin, and is formed in a contour similar to that of the outer-peripheral portion of the separators 13, 14. Through-holes corresponding to a cathode gas supply port 15a, a cooling fluid supply port 15b, and an anode gas supply port 15c are opened in one longitudinal-direction end of the frame member 15. Similarly, through-holes corresponding to an anode gas discharge port 15d, a cooling fluid discharge port 15e, and a cathode gas discharge port 15f are opened in the other longitudinal-direction end of the frame member 15.

It is necessary to stack together a plurality of the fuel battery cells 10a described above in a tightly sealed state. Therefore, the stacked fuel battery cells 10a are sealed by applying a sealing member to the outer periphery between the separator 13 and the MEA 11 and between the separator 14 and the MEA 11. One example of the material used in the sealing member is a thermosetting resin. The thermosetting resin is selected from, e.g., phenol resin, epoxy resin, and unsaturated polyester. Additionally, the elastic member 30 is arranged between adjoining separators 13 and separators 14 in the stacked fuel battery cells 10a, and the outer periphery of the separators 13, 14 is sealed by welding. However, it is possible to seal the outer periphery of the separators 13, 14 using the same sealing member as was described above.

The current collectors 16, 17, shown in FIGS. 9 and 10, draw out the electric power produced by the fuel battery cells 10a to the outside.

The current collectors 16, 17 are respectively disposed on the two ends of the stack 10 in which the plurality of fuel battery cells 10a are stacked. The pair of current collectors 16, 17 are similar in contour to the slightly thicker MEA 11 in all but one region. Through-holes corresponding to cathode gas supply ports 16a, 17a, cooling fluid supply ports 16b, 17b, and anode gas supply ports 16c, 17c are opened in one longitudinal-direction end of the pair of current collectors 16, 17. Similarly, through-holes corresponding to anode gas discharge ports 16d, 17d, cooling fluid discharge ports 16e, 17e, and cathode gas discharge ports 16f, 17f are opened in the other longitudinal-direction end. Current-collecting parts 16h, etc. are provided in the centers of the pair of current collectors 16, 17.

The current-collecting parts 16h, etc. of the pair of current collectors 16, 17 comprise, e.g., an electroconductive member such as dense carbon that does not transmit gas, the current-collecting parts 16h, etc. being formed in a thin-plate shape slightly smaller than the contours of the anode 11b and cathode 11c. The current-collecting parts 16h, etc. come into contact with the anode 11b or cathode 11c of the MEA 11 provided to the outermost layer of the plurality of stacked fuel battery cells 10a. A cylindrical, electroconductive protruding part 16g, etc. is provided so as to protrude from one surface of each of the current-collecting parts 16h, etc. The protruding parts 16g, etc. are inserted through through-holes 25g, etc. in the pair of end plates 25, 26 of the casing 20 described later, the protruding parts 16g, etc. facing outward. A shape corresponding to the protruding part 16g of the current collector 16 is similarly provided on the current collector 17.

The casing 20, shown in FIGS. 8 and 9, holds together the plurality of stacked fuel battery cells 10a and the current collectors 16, 17 in a tightly sealed state.

The casing 20 includes the fastening plates 21, 22, the reinforcing plates 23, 24, and the pair of end plates 25, 26 as described above, as well as screw 27. The members included in the casing 20 will be described below. The end plates 25, 26 hold therebetween and urge the pair of current collectors 16, 17 disposed on the two ends of the stacked plurality of fuel battery cells 10a. The end plates 25, 26 are similar in contour to the slightly thicker MEA 11 in all but one region. The end plates 25, 26 are made of, e.g., metal, an insulating body being provided to a portion that comes into contact with the pair of current collectors 16, 17. Through-holes corresponding to cathode gas supply ports 25a, 26a, cooling fluid supply ports 25b, 26b, and anode gas supply ports 25c, 26c are opened in one longitudinal-direction end of the pair of end plates 25, 26. Similarly, through-holes corresponding to anode gas discharge ports 25d, 26d, cooling fluid discharge ports 25e, 26e, and cathode gas discharge ports 25f, 26f are opened in the other longitudinal-direction end. The end plates 25, 26 have through-holes 25g, 26g through which the protruding parts 16g, etc. of the pair of current collectors 16, 17 described previously are inserted.

The fastening plates 21, 22 are made of, e.g., metal, and are formed in a plate shape. The fastening plates 21, 22 are formed such that some of the edge parts thereof are raised upright, the edges being in contact with the surfaces of the end plates 25, 26 during assembly. Holes through which screws 27 are inserted are provided to the surfaces of the fastening plates 21, 22 that are in contact with the end plates 25, 26; fastening the screws 27 mounted in the holes causes pressure to be applied to the end plates 25, 26, the current collectors 16, 17, and the stack 10 in the stacking direction. The reinforcing plates 23, 24 are made of, e.g., metal, and are formed in a plate shape longer and narrower than that of the fastening plates 21, 22. The reinforcing plates 23, 24 are formed such that some of the edge parts thereof are raised upright in the longitudinal direction, these portions being provided with holes through which screws 27 are inserted. The holes are formed such that the screws 27 pass therethrough in the stacking direction; mounting and fastening the screws 27 causes pressure to be applied to the end plates 25, 26, the current collectors 16, 17, and the stack 10 in the stacking direction, similarly to the fastening plates 21, 22. Thus, fastening the screw 27 in the fastening plates 21, 22 and the reinforcing plates 23, 24 causes pressure to be applied to the end plates 25, 26, the current collectors 16, 17, and the stack 10 in the stacking direction.

FIG. 7 is a perspective view showing a stacking step for stacking components that constitute a fuel cell. The cooling fluid supply ports 13b-17b, 25b, 26b and cooling fluid discharge ports 13e-17e, 25e, 26e of the separators 13, 14, frame member 15, current collectors 16, 17, and end plates 25, 26 are utilized as formations for aligning the structural components when the fuel battery cells 10a, current collectors 16, 17, and end plates 25, 26 are stacked. A fuel cell stacking device 300 used in the stacking step will be described in outline. In the fuel cell stacking device 300 shown in FIG. 7, a reference stand 320 is installed on a support stand 310, the reference stand 320 being provided with adjustable positioning columns 330, 340 interposed by a gap. The gap between the positioning columns 330, 340 is adjusted by inserting the positioning columns 330, 340 into reference holes 351, 352 in a tool for adjusting the gap between the columns 350, and causing reference side columns 361, 362 that hold the tool for adjusting the gap between the columns 350 to move closer together or farther apart. When stacking the separators 13, 14 and the MEA 11, it is possible to hold spacers 370 therebetween so that adjacent members temporarily do not come into direct contact with each other. The spacers 370 are rotatably held by a support column 380. The movements of the reference side columns 361, 362, etc. are controlled by a control unit 390 comprising a CPU, a RAM, a ROM, and other such components.

Of the components constituting the fuel cell 100, the fuel battery cells 10a, current collectors 16, 17, and end plates 25, 26 stacked in the stacking direction of the fuel battery cells 10a are aligned by inserting the positioning column 330 into the cooling fluid supply ports 13b-17b, 25b, 26b and inserting the positioning column 340 into the cooling fluid discharge ports 13e-17e, 25e, 26e. Additionally, during alignment of the separators 13, 14 and the elastic member 30 when forming the separator assembly 12, as described later, the separators 13, 14 and the elastic member 30 are aligned by inserting positioning members into the cooling fluid supply ports 13b-17b, 25b, 26b and cooling discharge ports 13e-17e, 25e, 26e. Using the same formation for positioning during forming of the separator assembly as for positioning during stacking of the structural components of the fuel cell 100 in this manner eliminates positional variation between references that arises when the references for the stacking of the structural components of the fuel cell and those for the forming of the separator assembly are different, and makes it possible to minimize assembly variations during stacking of the structural components of the fuel cell and during forming of the separator assembly.

Apparatus for Manufacturing Separator Assembly

The manufacturing of the separator assembly that constitutes the fuel cell according to the present embodiment will be described in detail below. The steps for manufacturing structural components of the fuel cell other than the separator assembly and for assembling these structural components involve the use of well-known devices; therefore, no description will be given therefor.

A device 200 for manufacturing the separator assembly 12 according to the present embodiment comprises: a conveyor 210 for conveying the separators 13, 14 and elastic member 30 that constitute the separator assembly 12; a stage 220 (corresponding to a placement part) on which a prescribed number of the separators 13, 14 and elastic members 30 that have been installed on the conveyor 210 are placed; hand robots 240, 250, 260 for placing the separators 13, 14 and elastic member 30 on the stage 220; a welding robot 270 (corresponding to a joining part) for joining together the separators 13, 14, elastic member 30, and other workpieces placed on the stage 220; and a pressing member 280 for applying pressure to press the separator 13 toward the elastic member 30 when the elastic member 30 is joined to the separator 13.

The conveyor 210 conveys the separators 13, 14, elastic member 30, and other workpieces that constitute the separator assembly 12 from left to right as in FIG. 2 to send these workpieces to the subsequent step. The conveyor 210 is provided with stop positions 210a-210d for assembling the workpieces.

Positioning members for aligning the separators 13, 14 and the elastic member 30 are installed on the stage 220. The positioning members have urging members 231-235 for moving the elastic member 30 or separator 13 to a prescribed position, and fixing pins 221-227 for positioning the elastic member 30 and the separator 13 or separator 14 that have been urged by the urging members 231-235 in the prescribed position. In the present embodiment, the elastic member 30 is aligned with and joined to the anode separator 13; it is also possible to align and join the elastic member 30 to the cathode separator 14 using the same method.

Among the urging members 231-235 and fixing pins 221-227, the urging members 231, 232 and the fixing pins 221-224 (corresponding to first positioning members) are utilized in positioning the elastic member 30. The urging members 233-235 and the fixing pins 225-227 (corresponding to second positioning members) are utilized in positioning the separator 13. The elastic member 30 and the separator 13 are classed in terms of being positioned on the stage 220 with regard to the longitudinal direction d1 and the transverse direction d2 of the contour of the separator 13 in FIG. 4(A). The urging members 231, 233, 234 and fixing pins 223, 224, 225, 226 are utilized in positioning in the transverse direction d2. The urging members 232, 235 and fixing pins 221, 222, 227 are utilized in positioning in the longitudinal direction d1.

In terms of contact between adjacent separators, what strongly affects the power generation characteristics of the fuel cell is the degree of contact between the irregularities constituting the corrugations 13g, 14g of the separators 13, 14, which are in contact with each other, and the elastic member 30. Therefore, as long as the fixing pins 221-227 and the urging members 231-235 at least hold and align the separator 13 and the elastic member 30 therebetween from the direction (transverse direction d2) in which the irregularities constituting the corrugations 13g, 14g are lined up, it will be possible to precisely align the positions of the convex parts of the corrugations of the separator 13 that are in contact with the elastic member 30 and the positions of the upright pieces 32 of the elastic member 30, and to minimize the electrical resistance between fuel battery cells. Therefore, the fixing pins 221, 222, 227 and urging members 232, 235 that are necessary for positioning in the direction d1 in which cross-sections of the irregularities of the corrugations 13g extend do not have to be used.

The elastic member 30 is positioned by using the urging members 231, 232 to press the elastic member 30 toward the fixing pins 221-224 and bring the elastic member 30 into contact therewith. Conversely, the separator 13 is positioned by inserting the fixing pins 226, 227 into the cooling fluid supply port 13b, inserting the fixing pin 225 into the fluid discharge port 13e, and using the urging members 233-235 to press the separator 13 toward the fixing pins 225-227 and bring the separator 13 into contact therewith.

Positioning the separators 13, 14 involves arranging and positioning the fixing pins 225, 226 in the cooling fluid supply port 13b and the cooling fluid discharge port 13e, which are arranged to form a pair across the corrugations 13g, 14g, the corrugations 13g, 14g having irregularly shaped cross-sections in the longitudinal direction d1 of the separator 13. Therefore, it is possible to minimize the occurrence of situations in which the separator 13 inadvertently rotates when the timing of pressure from the urging member 233 and from the urging member 234 shifts while pressure is applied by the urging members 233, 234, and to improve the workability of alignment. However, the arrangement of the fixing pins 225, 226 is not limited to assembly in the cooling fluid supply ports 13b, 14b and the cooling fluid discharge ports 13e, 14e; any set from among the cathode gas supply ports 13a, 14a, cooling fluid supply ports 13b, 14b, and anode gas supply ports 13c, 14c, and any set from among the anode gas discharge ports 13d, 14d, cooling fluid discharge ports 13e, 14e, and cathode gas discharge ports 13f, 14f may be selected. The arrangement of the fixing pins 225, 226 as illustrated in FIG. 12 can also be applied in the stacking step.

The fixing pins 221-227 and urging members 231-235 can be allowed to sink into and retract into the placement surface of the stage 220 by a spring or the like. Therefore, because it is possible to cause the fixing pins 221-224 and urging members 231, 232 to descend into the stage 220 when positioning the separator 13 on the stage 220 after positioning the elastic member 30, there is no hindrance to positioning the separator 13. Accordingly, the elastic member 30 and the separator 13 can be highly accurately aligned even without enlarging the separator 13 or enlarging the contour of the elastic member 30 to same size as that of the separator 13. There should be no hindrance to the installation of the separator 13 during positioning of the separator 13 on the elastic member 30; therefore, a configuration may be adopted in which the fixing pins 221-224 and the urging members 231, 232 can be made to retract into the placement surface.

The process of joining the elastic member 30 and the separator 13 is configured such that the elastic member 30 is installed on the stage 220 first. As described above, it is unnecessary for the elastic member 30 to comprise the cathode gas supply port 13a, cooling fluid supply port 13b, anode gas supply port 13c, anode gas discharge port 13d, cooling fluid discharge port 13e, cathode gas discharge port 13f, or the like of the separator 13. Therefore, the contour of the elastic member 30 is smaller than that of the separator 13. However, installing the elastic member 30 on the stage 220 first makes it possible to position the elastic member 30 by utilizing the fixing pins 221-224 and the urging members 231, 232, and to align the elastic member 30 and the separator 13 without enlarging the contour of the elastic member 30 to the same size as that of the separator 13.

A configuration is adopted such that the height h1 of the fixing pins 221-227 and urging members 231-235 is greater than the height h2 when no load is applied to the elastic member 30, as shown in FIGS. 6(A)-6(C). Therefore, the elastic member 30 can be held in place by the fixing pins 221-224 even when the elastic member 30 is pressed against the fixing pins 221-224 by the urging members 231, 232 in a state in which the elastic member 30 is not being pressed in the stacking direction. Accordingly, it is possible to prevent the incidence of the elastic member 30 passing over the fixing pins 221-224 or urging members 231, 232 and separating, and to improve the workability of alignment.

The hand robots 240, 250, 260 are multi-jointed, the ends of the hand robots 240, 250, 260 being provided with hand mechanisms for gripping components. The hand robots 240, 250, 260 grip components by using the hand mechanisms, move the components to the stage 220 by turning the joints, and install the components on the stage 220.

The welding robot 270 has a welding torch attached to the end thereof, the welding robot 270 joining the separator 13 to the elastic member 30 by welding and joining the separator 14 to the separator 13 by welding. The joining of the elastic member 30 and the separator 13, as shown in FIG. 5, is performed by partially welding in irregular sections 13k that constitute corrugations 13g along the direction in which the cross-sectional shape of the irregularities extends. The joining of the separator 13 and the separator 14 is also performed by welding at the edge part 13m of the cathode gas supply port 13a, the edge part 13n of the anode gas supply port 13c, the edge part 13p of the anode gas discharge port 13d, the edge part 13q of the cathode gas discharge port 13f, and the four sides 13r, 13s, 13t, 13u that form the contour of the separator 13.

The pressing member 280 applies pressure to press the separator 13 toward the elastic member 30 when the elastic member 30 and the separator 13 are joined. It is necessary for the welding robot 270 to irradiate a laser beam or the like on portions of the plurality of irregularities, which constitute the corrugations 13g of the separator 13 that are in contact with the elastic member 30. Therefore, a slit is provided to the pressing member 280, as shown in FIG. 6(A), so that the laser can be transmitted therethrough above positions at which the corrugations 13g are in contact with the elastic member 30 when the elastic member 30 has been aligned with the separator 13.

Method for Manufacturing Separator Assembly

The steps for forming the separator assembly according to the present embodiment will be described below. The formation of the separator assembly includes a preparation step (step ST10) for preparing the separators 13, 14 and the elastic member 30, a first placement step (step ST20) in which the elastic member 30 is placed so as to be positioned on the placement surface of the stage 220, a second placement step (step ST30) in which the separator 13 is installed on the stage 220 in a state in which the elastic member 30 has been positioned, a first joining step (step ST40, corresponding to a joining step) for joining the elastic member 30 and the separator 13, and a second joining step (step ST50, corresponding to another joining step) for joining the separator 13 and the separator 14.

Preparation Step, First Placement Step

In the preparation step, a component installment location (not shown) is provided in a position in which the hand robots 240, 250 are capable of gripping, and the elastic member 30, separators 13, 14, and other components that constitute the fuel cell are set up. In the first placement step, the stage 220 installed on the conveyor 210 shown in FIG. 2 is conveyed to the position 210a. The robot 240 grips the elastic member 30 from the component installment location, and conveys the elastic member 30 to the stage 220 at the position 210a. The robot 240 uses the grasped elastic member 30 to move the urging members 231, 232 in a direction away from the fixing pins 221-224. The urging force of the urging members 231, 232 is then utilized to move the elastic member 30 toward the fixing pins 221-224, and the elastic member 30 is held between the urging members 231, 232 and fixing pins 221-224. The elastic member 30 is thereby positioned on the stage 220.

Second Placement Step

Once the positioning of the elastic member 30 is complete, the stage 220 is conveyed to the position 210*b*. In the second placement step, the robot 250 grips the anode separator 13 from the component installment location, and conveys the anode separator 13 to the stage 220 at the position 210*b*. The separator 13 is then used to move the urging members 233-235 further away from the fixing pins 225-227, the urging force of the urging members 233-235 is utilized to move the separator 13 toward the fixing pins 225-227, and the separator 13 is held between the urging members 233-235 and fixing pins 225-227. The separator 13 is thereby positioned on the stage 220, and the elastic member 30 and the separator 13 are aligned. After the separator 13 is positioned on the stage 220, the pressing member 280 is placed over the separator 13 in order to bring the separator 13 and the elastic member 30 into sufficient contact.

First Joining Step

The stage 220 is subsequently conveyed to the position 210*c*. In the first joining step, first the positions of the elastic member 30 and the separator 13 at the position 210*c* are confirmed, and then, in order to join the elastic member 30 and the separator 13, a welding head 271 of the welding robot 270 is moved into the slit provided to the pressing member 280, i.e., above the welding site. Joining is then performed by welding along the direction in which the corrugations 13*g* of the separator 13 extend. The prescribed positions 13*k* (see FIG. 5) on the corrugations 13*g* of the separator 13 are thereby joined by welding, and the elastic member 30 and the separator 13 are joined.

Second Joining Step

Once the first joining step is finished, the stage 220 is conveyed to the position 210*d*. In the second joining step, the robot 260 grips the joined elastic member 30 and separator 13 at the position 210*d* and rotates these components 180°. This changes the positional relationship between the elastic member 30 and the separator 13 from the state shown in FIG. 6(A) to that shown in FIG. 6(B). The stage 220 is then arranged at position 210*b*, and the elastic member 30 and separator 13 that have been vertically reversed as shown in FIG. 6(B) are positioned on the stage 220. Because the fixing pins 221-224 and urging members 231, 232 can be allowed to sink into the stage 220 as described above, the arrangement of the separator 13 joined to the elastic member 30 is not hindered.

The positioning of the separator 13 joined to the elastic member 30 is performed by moving the urging members 233-235 further away from the fixing pins 225-227 in the same way as described above. The urging force of the urging members 233-235 is then utilized to move the separator 13 joined to the elastic member 30 toward the fixing pins 225-227, and the separator 13 joined to the elastic member 30 is held between the fixing pins 225-227 and urging members 233-235. The separator 13 joined to the elastic member 30 is thereby positioned in relation to the stage 220.

As shown in FIG. 6(C), the separator 14 above the separator 13 joined to the elastic member 30 is positioned using the fixing pins 225-227 and urging members 233-235 in the same manner as was the separator 13. The separator 13 and the separator 14 are thereby aligned.

Once the separator 13 and the separator 14 have been aligned, the stage 220 at the position 210*b* is conveyed to the position 210*c*. The edge parts 13*m*, 13*n*, 13*p*, 13*q* and four sides 13*r*, 13*s*, 13*t*, 13*u* of the separator 13 are then welded by the welding robot 270, and the two separators are joined. Welding is performed first on the edge parts 13*m*, 13*n*, 13*p*, 13*q*, and then on the four sides 13*r*, 13*s*, 13*t*, 13*u*. Because the contact between the corrugations of the separators 13, 14 affects the power generation characteristics of the fuel cell 100, the side 13*r* and the side 13*t* are welded earlier than are the side 13*s* and the side 13*u*. Joining the edge parts 13*m*, 13*n*, 13*p*, 13*q* and four sides 13*r*, 13*s*, 13*t*, 13*u* of the separator 13 in this manner joins the separator 13 to the separator 14, and completes the separator assembly 12.

Stacking Step

Once the separator assembly 12 has been completed, separator assemblies 12 are arranged on both side surfaces of the MEA 11 to form a fuel battery cell 10*a*, and a prescribed number of fuel battery cells 10*a* are stacked to form a stack 10. The current collectors 16, 17 are then arranged along the stacking direction of the stack 10, and the stack 10 and current collectors 16, 17 are covered by the fastening plates 21, 22, reinforcing plates 23, 24, and end plates 25, 26. Attaching and fastening screws 27 to the fastening plates 21, 22 causes pressure to be applied to the layered body 10, current collectors 16, 17, and end plates 25, 26, and completes the fuel cell 100.

The operation and effect according to the present embodiment will be described below. In fuel batteries, an elastic member may be installed between adjoining separators located between adjacent fuel battery cells in order to minimize electrical resistance between fuel battery cells that would be caused by the incidence of contact between the separators. However, because the elastic member absorbs variations in the forms of portions corresponding to corrugations among the formations of the separators, it is unnecessary, in consideration only of stacking, to enlarge the circulation holes for fuel, oxidant, and cooling fluid that are provided further outward than are the corrugations. However, when through-holes are provided to the four corners of the structural components and positioning is performed by inserting positioning pins therethrough, as in the prior art, because the contours of the separators and the elastic member are different, the configuration of the elastic member having a smaller contour must be enlarged to yield a contour equal to that of the separators, increasing the cost of the elastic member.

However, in the method and apparatus for manufacturing a separator assembly for a fuel cell according to the present embodiment, separators 13, 14 and an elastic member 30 having a smaller contour than that of the separators 13, 14 are prepared, fixing pins 221-224 and the urging members 231, 232 are used to position the elastic member 30, fixing pins 225-227 and the urging members 233-235 are used to hold the separator 13 therebetween and bring the separator 13 into contact with the elastic member 30, and the separator 13 is positioned with respect to the elastic member 30. The fixing pins 221-224 and the urging members 231, 232, corresponding to first positioning members, can be made to retract so as not to protrude from a placement surface when the separator 13 is positioned on the elastic member 30. Therefore, the fixing pins 221-224 and the urging members 231, 232 will not hinder the arrangement of the separator 13 when the separator 13 is arranged on the elastic member 30. Accordingly, a separator assembly can be manufactured in which the separator 13 and the elastic member 30 are highly accurately aligned even without enlarging the contour of the elastic member 30 to same size as that of the separator 13.

Additionally, the second placement step is configured to be performed after the first placement step. Specifically, a configuration is adopted in which alignment is performed, when arranging the elastic member 30 and the separators 13, 14 on the stage 220, by arranging the separator 13 on the stage 220 after the elastic member 30 is arranged thereon. Therefore, the elastic member 30 can be positioned on the stage 220 and aligned with the separator 13 even when the elastic member 30 is not provided with a cathode gas supply port 13a, cooling fluid supply port 13b, anode gas supply port 13c, anode gas discharge port 13d, cooling fluid discharge port 13e, or cathode gas discharge port 13f, and it is possible to highly accurately align the elastic member 30 with the separator 13 while minimizing increases in the component cost of the elastic member 30.

Additionally, the fixing pins 221-224 and the urging members 231, 232, corresponding to first positioning members, and the fixing pins 225-227 and the urging members 233-235, corresponding to second positioning members, are configured so as to at least hold the elastic member 30 or separator 13 therebetween from the direction in which the irregularities constituting the corrugations 13g, 14g of the separators 13, 14 are lined up. In terms of contact between adjacent separators, what strongly affects the power generation characteristics of the fuel cell is the degree of contact between the irregularities constituting the corrugations 13g, 14g of the separators 13, 14, which are in contact with each other, and the upright pieces 32 of the elastic member 30. Therefore, as long as the separator 13 and the elastic member 30 are at least held therebetween from the direction in which the irregularities constituting the corrugations 13g, 14g are lined up, it will be possible to precisely align the positional relationship of the two components in the direction in which the irregularities line up, and it will be unnecessary to enlarge the elastic member 30 to the same size as the separators 13, 14. Accordingly, it is possible to minimize electrical resistance between fuel battery cells by precisely aligning the positions of the elastic member and the separator even without enlarging the separator 30 to the same size as the separators 13, 14.

Additionally, the separators 13, 14 have cathode gas supply ports 13a, 14a; cooling fluid supply ports 13b, 14b; anode gas supply ports 13c, 14c; anode gas discharge ports 13d, 14d; cooling medium discharge ports 13e, 14e; and cathode gas discharge ports 13f, 14f through which the fuel that generates electromotive force in the fuel cell 100, the oxidant, or the cooling fluid passes, the cooling fluid supply ports 13b, 14b and cooling fluid discharge ports 13e, 14e being used by the fixing pins 225-227 and urging members 233-235 that correspond to second positioning members to align the elastic member 30 and the separator 13. Therefore, it is possible to align the separator 13 with an elastic member 30 even without designing the separator in accordance with a separate set of specifications for use in a fuel cell in which no elastic member 30 is used and no specific shape is provided for alignment with the elastic member 30.

Additionally, in the second placement step, a configuration is adopted in which the cathode gas supply ports 13a, 14a, cooling fluid supply ports 13b, 14b, and anode gas supply ports 13c, 14c and the anode gas discharge ports 13d, 14d, the cooling fluid discharge ports 13e, 14e, and the cathode gas discharge ports 13f, 14f, which are arranged to form pairs across the corrugations 13g, 14g, the corrugations 13g, 14g having irregularly shaped cross-sections in the separators 13, 14, are used to position the separator 13. Therefore, it is possible to prevent the incidence of positioning taking a long time due to inadvertent rotation or the like of the separator 13 during positioning thereof, and to improve the workability of positioning.

Additionally, a configuration is adopted such that the height of the fixing pins 221-227 and the urging members 231-235 used to align the elastic member 30 and separator 13 is greater than the height when no pressure is applied to the elastic member 30. Therefore, it is possible to firmly hold the elastic member 30 between the fixing pins 221-227 and the urging members 231-235 even when the elastic member is not being pressed and the positions of the upright pieces 32 are not flexed, and to improve the reliability of positioning.

Additionally, a configuration is adopted in which, after the first joining step for joining the elastic member 30 and the separator 13, the second joining step is performed to align the separator 13 and the separator 14. The elastic member 30 is arranged between the separator 13 and the separator 14; therefore, were, e.g., the elastic member 30 to be arranged between the separator 13 and the separator 14 after the outer peripheries of the separator 13 and separator 14 were partially joined, there would be a risk that the elastic member 30 would be joined in a deviant position because it would be impossible to hold the position of the elastic member 30 arranged between the separators 13, 14. However, first joining the elastic member 30 to the separator 13 fixes the position of the elastic member 30 in relation to the separator 13, and makes it possible to prevent the position of the elastic member 30 from deviating even when the elastic member 30 is arranged between the separator 13 and the separator 14. Accordingly, the separator assembly can be formed in a state in which the elastic member 30 is highly accurately aligned with the corrugations 13g, 14g of the separators 13, 14, and electrical resistance between fuel battery cells can be effectively minimized.

Additionally, in the second joining step, the joining of the separator 13 and the separator 14 is configured such that the sides 13r, 13t adjacent to the corrugations 13g are first joined by welding earlier than are the sides 13s, 13u adjacent to the cathode gas supply port 13a, the cooling fluid supply port 13b, the anode gas supply port 13c, the anode gas discharge port 13d, the cooling fluid discharge port 13e, and the cathode gas discharge port 13f. As described above, the state of contact between the corrugations of adjacent separators strongly affects increases in electrical resistance between fuel battery cells. Therefore, first joining the sides 13r, 13t close to the corrugations 13g from among the four sides that form the contour of the separator 13 makes it possible to prevent the position of the elastic member 30 from deviating when the elastic member 30 is held between the separator 13 and the separator 14, and to minimize increases in electrical resistance between fuel battery cells by highly accurately bringing the separators 13, 14 into contact with the elastic member 30.

Additionally, in the first joining step, a configuration is adopted such that the elastic member 30 is pressed in the stacking direction of the elastic member 30 and separator 13 in a state in which the elastic member 30 is in contact with the placement surface of the stage 220. Therefore, it is possible to bring the elastic member 30 into closer contact with the separator 13 and join the elastic member 30 thereto due to the resilience of the elastic member 30, and to contribute to minimizing increases in the electrical resistance between fuel battery cells.

Additionally, the cooling fluid supply port 13b and cooling fluid discharge port 13e used in positioning the elastic member 30 and the separator 13 are also used as formations for arranging and positioning current collectors 16, 17 and end plates 25, 26 at both ends of a stack 10 and stack 10 formed by stacking fuel battery cells 10a in the stacking step. Therefore, it is possible to adopt a configuration in which no variations arise between references that would be caused by differences between the references used when stacking the structural components of the fuel cell and those used when forming the separator assembly, and to minimize assembly variations during stacking of the structural components of the fuel cell and during forming of the separator assembly.

Additionally, the pressure load applied by the pressing member 280 to press the separator 13 toward the elastic member 30 in the first joining step is higher than that applied in the stacking step during stacking of the structural components of the fuel cell. When the elastic member 30 and the separator 13 are to be joined, the resilience of the elastic member 30 allows it to re-extend, without being held between the separators 13, 14. Applying a higher load to the elastic member 30 in such situations than during the stacking step makes it possible to minimize the occurrence of plastic deformation of the elastic member 30 even when a high load is applied, and to improve the functionality of the elastic member 30 as a shock-absorbing member.

The present invention is not limited to the embodiment described above; various modifications within the scope of the claims can be applied.

An embodiment was described in which the joining of the elastic member 30 and the separator 13 is performed by forming several joining sites 13k (e.g., 12 sites in FIG. 10) along the direction in which the corrugations of the separator 13 extend, and then joining the edge parts 13m, 13n, 13p, 13q and outer periphery 13r, 13s, 13t, 13u; however, this description was not given by way of any limitation. The elastic member 30 and the separator 13 can be provisionally fixed even if welding is not performed at any of the 12 sites. Therefore, it is possible to weld some of the 12 joining sites 13k of the corrugations 13g shown in FIG. 5 in the first joining step, join the edge parts 13m, 13n, 13p, 13q and outer periphery 13r, 13s, 13t, 13u in the second joining step, and then weld any remaining sites among the joining sites 13k of the corrugations.

The invention claimed is:

1. A manufacturing method for manufacturing a separator assembly for a fuel cell, in which a channel through which a fluid flows is formed so as to be provided adjacent to a membrane electrode assembly, the method for manufacturing a separator assembly for a fuel cell comprising:
   a preparation step for preparing a first separator having an irregular cross-sectional shape, a second separator having an irregular cross-sectional shape, and an electroconductive elastic member having a contour smaller than a plan-view contour of the first separator and the second separator as viewed from a planar direction, the elastic member being arranged between the first separator and the second separator, and elastically deforming to maintain contact between convex portions of the first separator and convex portions of the second separator that face each other;
   a first placement step in which a plurality of first positioning members provided on a placement surface are brought into contact with the elastic member such that the elastic member is positioned and placed on the placement surface;
   a second placement step in which a plurality of second positioning members provided in a region of the placement surface that is further outward than a region in which the first positioning members are provided are brought into contact with the first separator such that the first separator is positioned in relation to the elastic member and placed so as to overlap the elastic member; and
   a joining step for joining together the elastic member and the first separator, which have been positioned and made to overlap, and
   in the second placement step, the first separator is made to overlap the elastic member while the first positioning members for positioning the elastic member are made to retract into the placement surface.

2. The manufacturing method as recited in claim 1, wherein
   the second placement step is performed after the first placement step.

3. The manufacturing method as recited in claim 1, wherein
   the first positioning members and the second positioning members are arranged so as to at least hold the first separator and the elastic member therebetween from a direction in which irregularities of the first separator and second separator are lined up.

4. The manufacturing method as recited in claim 1, wherein
   the first separator and the second separator comprise a plurality of separator circulation holes for circulating fuel for generating electromotive force in the fuel cell, oxidant, or cooling fluid for cooling the fuel cell, and
   the second positioning members position the first separator using the separator circulation holes.

5. The manufacturing method as recited in claim 4, wherein
   the separator circulation holes are arranged to form pairs across portions having irregularly shaped cross-sections in plan view, and
   in the second placement step, the first separator is positioned using separator circulation holes that are arranged to form a pair.

6. The manufacturing method as recited in claim 1, wherein
   the first positioning members and the second positioning members are configured to be taller than a height of the unloaded elastic member.

7. The manufacturing method as recited in claim 1, wherein
   the method furthermore has another joining step for joining the first separator and the second separator after the joining step.

8. The manufacturing method as recited in claim 4, wherein
   the method furthermore has another joining step for joining the first separator and the second separator after the joining step,
   the first separator and the second separator include:
      a first pair of sides adjacent to the separator circulation holes; and a second pair of sides more closely adjacent to the portions having irregularly shaped cross-sections than the first pair of sides, and in the other joining step, the second pair of sides are joined earlier than are the first pair of sides.

9. The manufacturing method as recited in claim 1, wherein in the joining step, the elastic member is pressed in a stacking direction of the elastic member and the first separator in a state in which the elastic member is in contact with the placement surface.

10. A method for manufacturing a fuel cell, comprising:

a stacking step for alternatingly stacking the separator assembly and the membrane electrode assembly as recited in claim 1, arranging at least current collectors and end part members on both end parts of a stacked membrane electrode assemblies and separator assemblies in a stacking direction, and applying a pressure load in the stacking direction, wherein each of the membrane electrode assemblies comprises a frame member at an outer periphery thereof, the frame members, the current collectors, and the end part members each have linking holes that link with separator circulation holes upon stacking, and in the stacking step, the separator assemblies, the membrane electrode assemblies, current collectors, and end part members being aligned using the separator circulation holes and edge parts of the linking holes of the frame members, the current collectors, and the end part members.

11. The manufacturing method as recited in claim 10, wherein a pressure load higher than applied in the stacking step is applied from the stacking direction to the elastic member in the joining step.

* * * * *